June 13, 1939.  C. L. DEWEY ET AL  2,162,327

MACHINE FOR CONFIGURING TUBES

Filed Dec. 20, 1937  2 Sheets-Sheet 1

Inventors:
Clarence L. Dewey
and Sydney L. Dewey,
By Banning & Banning
Attorneys.

June 13, 1939.  C. L. DEWEY ET AL  2,162,327
MACHINE FOR CONFIGURING TUBES
Filed Dec. 20, 1937  2 Sheets-Sheet 2
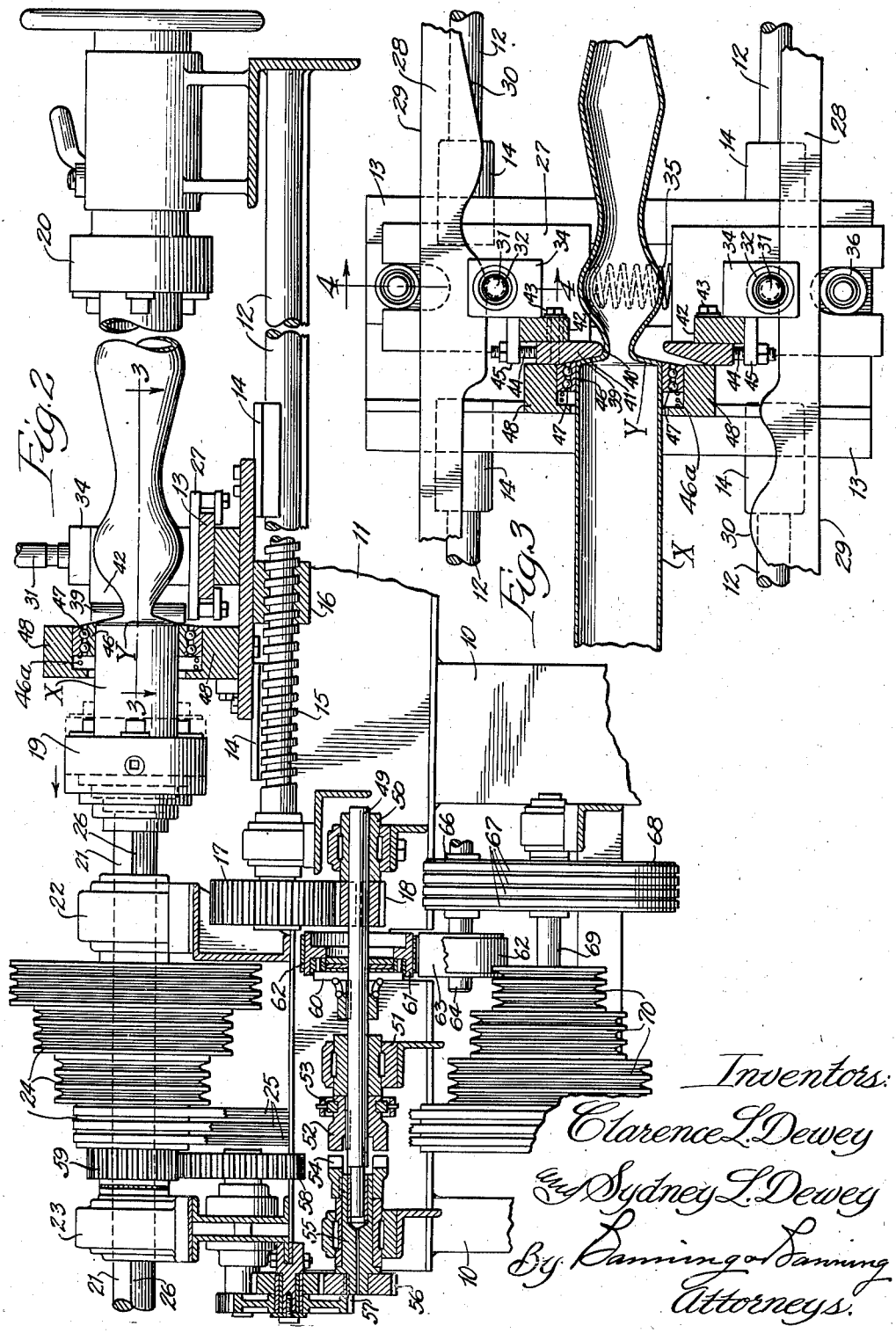
Inventors:
Clarence L. Dewey
Sydney L. Dewey
By Lanning & Lanning
Attorneys.

Patented June 13, 1939

2,162,327

UNITED STATES PATENT OFFICE 2,162,327

MACHINE FOR CONFIGURING TUBES

Clarence L. Dewey and Sydney L. Dewey, Elkhart, Ind., assignors to Metal Tube Shaping Corporation, Elkhart, Ind., a corporation of Indiana Application December 20, 1937, Serial No. 180,798

17 Claims. (Cl. 113—53)

The machine of the present invention is designed to impart any desired configuration in outline to an elongated tube by the employment of a deforming tool (or tools) mounted to move both radially and longitudinally of the tube axis, so that any desired configuration may be imparted to the tube in conformity with a predetermined pattern imparted to the edge of a template which serves to regulate the in and out movements of the forming tool.

In particular, the invention relates to the means employed for embracing and reinforcing the tube at a point immediately in advance of the forming point; to the means for maintaining contact between the template and the slide plate which carries the tool; to the means provided for utilizing a plurality of tools which may be arranged to operate in a relay series; to the means for imparting longitudinal movement to the carriage which supports the slide plate and forming tool; and to the construction and arrangement of the machine as a whole.

The present machine is an improvement on that described and illustrated in application Serial No. 91,468, filed July 20, 1936, for Tube forming machines, of which this application is a continuation in part which is directed to the basic features of construction and operation employed in the present invention.

Further objects and details will appear from a description of the invention in conjunction with the accompanying drawings, wherein,—

Fig. 2 is a longitudinal sectional view thereof partially broken out in the center;

Fig. 3 is a sectional plan view taken on line 3 of Fig. 2; and

Figure 1:
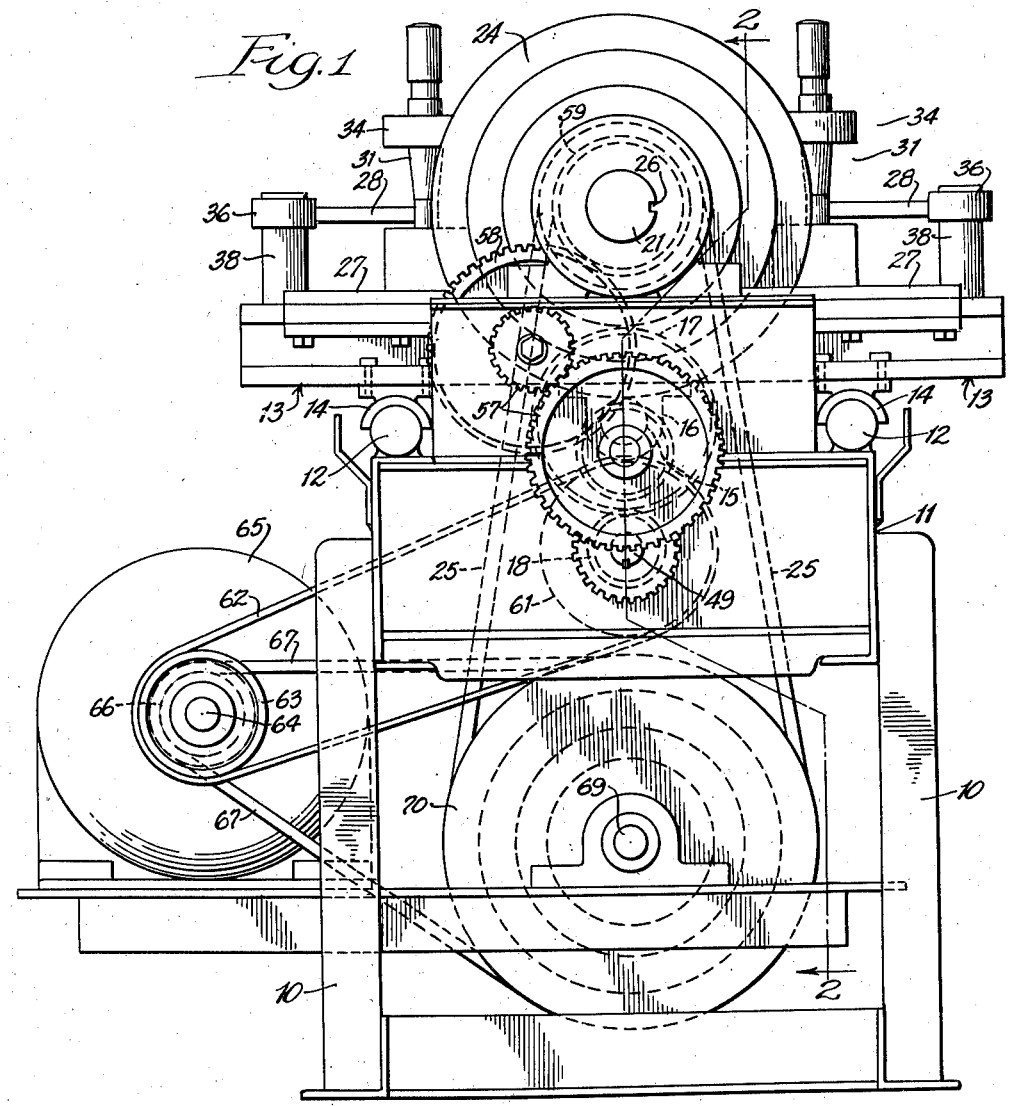
Figure 1 is an end elevation of the machine of the present invention.
Figure 4:
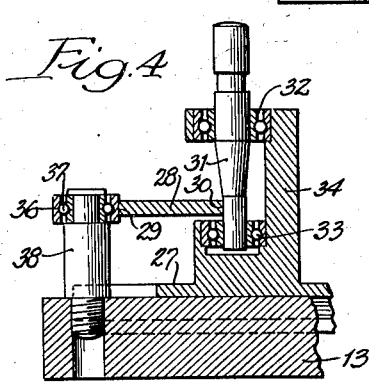
Fig. 4 is a detail of the rollers for contacting the edges of the template for imparting radial movements to the slide plate.

As shown, the machine is carried by standards or legs 10, which in conjunction support the frame 11 of the machine at a convenient elevation. The frame provides a support for a pair of spaced track rails 12 upon which rides a carriage 13 provided with brackets 14 which rest upon and embrace the respective rails 12.

Longitudinal feeding and return movements are imparted to the carriage by an elongated screw 15 threaded through a block 16 depending from the carriage, and the forward end of the screw is provided with a spur gear 17 meshing with a pinion 18 which serves to impart rotation to the screw in a manner presently to be described.

The tube X to be configured, as shown, is carried between chuck heads 19 and 20, the former of which is carried by a shaft 21 journalled and slidably mounted within journal bearings 22 and 23 between which are located pulleys 24 of progressively reducing diameter, any one of which is adapted to be engaged by belt members 25 for the purpose of imparting rotation to the shaft 21. The shaft is provided with an elongated groove 26 which receives a key or spline (not shown) for the purpose of engaging the driving pulleys with the shaft in such a way as to impart rotation thereto, while at the same time permitting the shaft to move longitudinally through bearings 22 and 23 to provide for the elongation of the tube incidental to its reduction in diameter. The chuck 20 is fixedly positioned, and as shown is not positively driven, although, if desired, positive driving connections may be provided for driving either or both of the chucks.

The carriage 13 has mounted thereon one or more slide plates 27 (two being shown for purposes of illustration), but since the slide plates and associated parts are identical in each case, a description of one will suffice for all.

The slide plate is mounted for transverse or radial movement with respect to the axis of the tube being configured, and in order to automatically impart the desired in and out movements to the slide plate, a template 28 is provided having a straight outer edge 29 and a patterned or configured inner edge 30. The inner edge is engaged by a roller 31 mounted within upper and lower ball bearings 32 and 33 carried by a standard 34 springing upwardly from the slide plate.

The slide plates are forced outwardly by the action of a spring 35, which as shown is interposed between the inner ends of the companion slide plates, although other means might be provided for maintaining contact between the rollers 31 and the respective templates.

Each template is suitably mounted upon the frame of the machine at the required distance from the axis of the tube, but since the maintenance of an exact relationship between the template and the tube is essential in the accurate production of the pattern, it is desirable to insure such accuracy at the forming point by providing for each template a roller 36 mounted upon ball bearings 37 carried by a rigid post 38 upstanding from the carriage at a point immediately beyond the outer straight edge of the template and in close longitudinal relation to the forming point, so that, as the carriage moves forward, and the slide plate is moved in and out in conformity with the configuration of the patterned edge of the template, the thrusts imparted thereto will be resisted by the roller 36, thereby insuring the necessary movements to compel the forming tool to accurately follow the path of movement determined by the configuration of the patterned inner edge of the template. This enables the employment of a relatively light or thin template without the necessity for supporting the same in an excessively rigid manner from the frame of the machine, by standards or otherwise.

Each of the slide plates provides support for a forming tool 39 which is provided with an acting edge 40 of curved cross section, which merges into an obliquely presented forward face 41 designed to act upon the shoulder Y formed in the tube X during the instant of its transformation from the uniform or undeformed condition illustrated at the left of Fig. 3 into the ultimate configuration illustrated at the right of said Fig. 3. The ratio observed between the radius of curvature of the edge of the forming tool and the obliquity of its acting face is an important factor in determining the ultimate wall thickness imparted to the configured tube, but these features form the subject of application Serial No. 180,799, filed concurrently herewith and need not be described in detail.

The forming tool 39 is held against a block 42 by a bolt 43, and adjusted by means of a screw 44 entered through a plate 45, the arrangement serving to hold the tool rigidly upon the slide plate so that its acting edge will partake of the in and out movements of the slide plate in imparting the desired configuration to the rotating tube.

In order to reinforce and sustain the tube at a point immediately adjacent to the forming point, a bevel faced ring-shaped bushing 46 is slidably mounted at a point adjacent to the forming tool and in contact with the forward face thereof and backed by a spring 46ᵃ so that the bushing will maintain contact with the face of the tool.

The bushing closely encircles the undeformed portion of the tube, without, however, engaging the same with sufficient firmness to interfere with the slipping of the bushing along the tube as the carriage is advanced. The bushing is mounted for rotation within ball bearings 47 carried within a block 48 rigidly secured to and upstanding from the carriage, which carriage is movable longitudinally between the chuck heads within the range afforded by the spacing of the heads.

The means provided for driving the carriage feed 15 will now be described. The pinion 18 is mounted upon a countershaft 49 suitably mounted within bearings 50 and 51, and said shaft has splined thereon a slidable clutch member 52 operated by a yoke 53 and adapted to engage with a clutch member 54 carried by an aligned transmission shaft 55 having a pinion 56, which forms part of a gear reduction train 57 terminating in a spur gear 58 meshing with a driving pinion 59 connected with the pulley group 24, so that when the clutch members are engaged, the rotation imparted to the shaft 21 which rotates the tube will be transmitted at a reduced ratio to the feed screw 15, thereby advancing the carriage along the tube at a speed commensurate with the rotation imparted to the tube, which ratio can, of course, be varied by the substitution of suitable gears in the reduction train 57.

In all cases, however, the speed of advance of the forming tool in ratio to the speed of rotation of the tube will be relatively slow, so that each section of the tube surface will be brought repeatedly into contact with the forming tool during the progress of the tube through the region of deformation, which thus has the effect of smoothing down or ironing out any perceptible grooves or corrugations occasioned by the advancing action of the forming tool against the tube shoulder which constantly evolves as the metal flows down behind the surrounding bushing. The arrangement is such that at each instant only a minute portion of the evolving shoulder will be displaced as the formation of the shoulder progresses, with the result that it is possible to effect very abrupt changes in the ultimate configuration of the tube without rupturing the metal or grooving it to any objectionable extent.

Although it is desirable to impart a relatively slow feeding speed to the carriage during the period of its forward advance, it is also desirable to provide for a quick return of the carriage, and for this purpose a friction clutch 60 is slidably mounted upon the countershaft 49 in position to engage with a pulley 61 which is driven by a belt 62 from a driving pulley 63 mounted upon the shaft 64 of a motor 65.

The motor shaft is also provided with a pulley 66 carrying belts 67 for driving a pulley 68 carried by a shaft 69 which mounts a group of pulleys 70 of varying diameter, any one of which may be selected to impart rotation to the corresponding pulley of the group 24 through the medium of the belt 25.

By throwing out the positive clutch connection 52—54 and setting the friction clutch 60—61, reverse rotation at rapid speed can be imparted to the carriage feed screw 15 for retracting the carriage to its rearmost position.

*Operation*

In operation, the undeformed tube section will be clamped between the chuck heads, the head 19 being longitudinally adjustable inwardly to afford the necessary degree of movement to compensate for the lengthening of the tube incidental to its formation. The driving chuck head 19 must be rigidly clamped to the tube in order to impart rotation thereto against the resistance of the forming tool, and the clutch head 20 must engage the tube with a sufficient grip to resist longitudinal movement and hold the tube against the advance of the forming tool; and with the parts thus adjusted and the properly configured template positioned, the positive clutch 52—54 will be engaged and the carriage will begin to move forwardly. The forward advance of the carriage causes the roller 51 to ride upon the configured inner edge of the template, thus forcing the forming tool to partake of in and out movements corresponding to the configuration of the template, thereby correspondingly configuring the tube, although the configuration of the template should be slightly exaggerated to compensate for the outward spring of the deformed metal when released from pressure.

At the point of deformation, the tube will be firmly held and sustained by the engagement of the bushing, so that the deforming action will be concentrated at a point immediately adjacent to the face of the tool, which enables a wide variation in configuration to be imparted to the tube without danger of disruption or undesired deformation of the metal and without the opportunity for the metal to pile up in advance of the forming tool and extrude outwardly.

As the tube is configured and its diameter is reduced, it will be correspondingly elongated, which elongation is permitted by the backward travel of the chuck head 19 carried by the slidably mounted shaft 21, although it may be desirable in certain cases to retard the slippage of the shaft 21 sufficiently to impede the unrestrained elongation of the tube, especially where a thickening of the tube walls is desired, in conformity with the principles set forth in detail in the application Serial No. 180,802, filed concurrently herewith.

In cases where it is desirable to operate forming tools in a sequence or relay, in order to permit forming tools of differing configuration to act upon successive sections of the tube, the duplicate arrangement shown in Fig. 3 may be employed, and templates utilized which supplement one another; that is to say, one of the tools may actively carry on the deforming operation up to a certain point while the companion tool or tools ride idly along the associated templates until the time arrives to impart active movements thereto, which sequence of operations will be determined by the configuration of the respective templates. In this way the idle tool or tools will stand in retracted position until an elevation is reached on the associated template which imparts an inward thrust to the tool and thus initiates and carries on its portion of the work in the relayed sequence.

Although we have shown two templates arranged to act in sequential relation, it may be desirable in certain cases to remove one of the templates and provide suitable means for the manual adjustment of the forming tool, which is especially desirable in experimental work and in cases where the immediate control of the tool by the operator is required.

Although the machine has been described with full particularity as to details, it is not the intention, unless otherwise indicated, to confine the invention to the precise arrangement shown, since modifications thereof may be made without departing from the principles of the invention.

We claim:

1. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a bushing carried by the carriage and positioned to engage and sustain the tube immediately in advance of the point of deformation by the tool, means for imparting predetermined in and out movements to the slide plate to impart the desired configuration to the tube, and means for holding the tube as a whole against the forward thrust of the forming tool.

2. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, and a member on the slide plate adapted to ride upon said edge for imparting corresponding in and out radial movements to the tool, and means for holding the tube as a whole against the forward thrust of the forming tool.

3. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, a member on the slide plate adapted to ride upon said edge for imparting corresponding in and out radial movements to the tool, and a member on the carriage engaging the outer edge of the template at a point closely adjacent to the point of deformation by the tool for holding the template in fixed relation to the axis of the tube, and means for holding the tube as a whole against the forward thrust of the forming tool.

4. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a bushing carried by the carriage and positioned to engage and sustain the tube immediately in advance of the point of deformation by the tool, means for imparting predetermined in and out movements to the slide plate to impart the desired configuration to the tube, and power transmission elements between the chuck rotating means and the carriage for advancing the carriage at a predetermined ratio to the rotation of the tube, and means for holding the tube as a whole against the forward thrust of the forming tool.

5. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, a member on the slide plate adapted to ride upon said edge for imparting corresponding in and out radial movements to the tool, and power transmission elements between the chuck rotating means and the carriage for advancing the carriage at a predetermined ratio to the rotation of the tube, and means for holding the tube as a whole against the forward thrust of the forming tool.

6. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, a member on the slide plate adapted to ride upon said edge for imparting corresponding in and out radial movements to the tool, a member on the carriage engaging the outer edge of the template at a point closely adjacent to the point of deformation by the tool for holding the template in fixed relation to the axis of the tube, and power transmission elements between the chuck rotating means and the carriage for advancing the carriage at a predetermined ratio to the rotation of the tube, and a fixed chuck for gripping the rear end of the tube.

7. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a bushing carried by the carriage and positioned to engage and sustain the tube immediately in advance of the point of deformation by the tool, means for imparting predetermined in and out movements to the slide plate to impart the desired configuration to the tube, and power transmission elements between the chuck rotating means and the carriage for advancing the carriage at a predetermined ratio to the rotation of the tube, said transmission elements including clutch members adapted when engaged to impart a return movement at increased speed to the carriage, and a fixed chuck for gripping the rear end of the tube.

8. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, a member on the slide plate adapted to ride upon said edge for imparting corresponding in and out radial movements to the tool, and power transmission elements between the chuck rotating means and the carriage for advancing the carriage at a predetermined ratio to the rotation of the tube, said transmission elements including clutch members adapted when engaged to impart a return movement at increased speed to the carriage, and a fixed chuck for gripping the rear end of the tube.

9. In a tube forming machine of the class described, the combination of a chuck member adapted to engage a tube, a slidably and rotatably mounted shaft carrying the chuck member, rotatable driving elements slidably engaging the shaft and fixedly held against longitudinal movement for imparting rotation to the shaft and permitting longitudinal movement thereof to compensate for elongation of the tube, a carriage mounted for longitudinal movement with respect to the tube, a slide plate mounted upon the carriage and movable thereon radially with respect to the axis of the tube, a forming tool carried by the slide plate and adapted to act against the wall of the tube, a rotatably mounted bushing carried by the carriage and positioned to engage and sustain the tube immediately in advance of the point of deformation by the tool, an elongated template having a configured edge, a member on the slide plate adapted to ride upon said edge for imparting corresponding in and out radial movements to the tool, a member on the carriage engaging the outer edge of the template at a point closely adjacent to the point of deformation by the tool for holding the template in fixed relation to the axis of the tube, and power transmission elements between the chuck rotating means and the carriage for advancing the carriage at a predetermined ratio to the rotation of the tube, said transmission elements including clutch members adapted when engaged to impart a return movement at increased speed to the carriage, and a fixed chuck for gripping the rear end of the tube.

10. In a tube forming machine of the class described, the combination of a chuck member adapted to engage a tube, means for imparting rotation to said chuck member and the tube engaged thereby, a carriage laterally adjacent to the tube and means for imparting longitudinal movement to the carriage, a forming tool slidably mounted upon the carriage in position to move radially with respect to the axis of the tube, an elongated template having an outer edge standing in substantially parallel relation to the axis of the tube and provided with a configured inner edge, a roller carried by the tool mounting and adapted to ride against the configured inner edge of the template, and a member carried by the carriage and acting against the outer parallel edge of the template at a point longitudinally adjacent to the point of deformation for holding the template against the thrust of the forming tool, and a bushing carried by the carriage and engaging and sustaining the undeformed portion of the tube and in substantial contact with the forward face of the forming tool.

11. In a tube forming machine of the class described, the combination of a chuck member adapted to engage a tube, rotating driving elements for imparting rotation to the chuck member and the tube engaged thereby, a carriage mounted for longitudinal movement with respect to the tube, a slide plate mounted upon the carriage and movable thereon radially with respect to the axis of the tube, a bevel faced forming tool carried by the slide plate and adapted to act against the wall of the tube, a longitudinally yieldable bushing carried by the carriage and positioned to engage and sustain the tube immediately in advance of the point of deformation by the tool and in position to maintain yieldable contact with the beveled forward face of the tool, and means for imparting predetermined in and out movements to the slide plate to impart the desired configuration to the tube.

12. In a tube forming machine of the class described, the combination of a bevel faced tool adapted to act against the wall of a tube, means for sustaining the tube in position to be acted upon by the tool, said means including a yieldably mounted bushing positioned to sustain the tube immediately in advance of the point of deformation by the tool and to maintain contact with the beveled forward face of the tool, means for imparting relative radial movements to the tool with respect to the axis of the tube, means for rotating the tube relatively to the tool, and means for advancing the tool longitudinally relatively to the tube.

13. In a tube forming machine of the class described, the combination of spaced chuck members mounted for relative longitudinal movement with respect to one another and adapted to engage the ends of a tube, means for imparting rotation to at least one of said chuck members for rotating the tube, a carriage intermediate the chuck members and a forming tool carried thereby and mounted thereon in a manner to permit radial movement of the forming tool with respect to the tube, reducing means in train with the tube rotating means for imparting longitudinal movements to the carriage relatively to the tube at such reduced rate of advance as to bring each portion of the rotating tube repeatedly into contact with the forming tool while the tube is progressing through the region of deformation, automatic means for variably regulating the radial position of the tool with respect to the tube to impart variable reductions in the diameter of the tube, and a tube supporting member closely engaging the tube at a point adjacent to the forming tool and forwardly thereof and movable longitudinally with the forming tool and adapted in conjunction with the tool to maintain a constantly evolving shoulder in the tube between the supporting member and the tool.

14. In a tube forming machine of the class described, the combination of spaced chuck members mounted for relative longitudinal movement with respect to one another and adapted to engage the ends of a tube, means for imparting rotation to at least one of said chuck members for rotating the tube, a carriage intermediate the chuck members and a forming tool carried thereby and mounted thereon in a manner to permit radial movement of the forming tool with respect to the tube, reducing means in train with the tube rotating means for imparting longitudinal movements to the carriage relatively of the tube at such reduced rate of advance as to bring each portion of the rotating tube repeatedly into contact with the forming tool while the tube is progressing through the region of deformation, a fixedly positioned longitudinally elongated template having a configured edge adapted to impart variable radial movements to the tool to cause corresponding variable reductions in the diameter of the tube, and a tube supporting member closely engaging the tube at a point adjacent to the forming tool and forwardly thereof and movable longitudinally with the forming tool and adapted in conjunction with the tool to maintain a constantly evolving shoulder in the tube between the supporting member and the tool.

15. In a tube forming machine of the class described, the combination of a chuck member adopted to engage the end of a tube, means for imparting rotation to said chuck member for rotating the tube, a carriage adjacent to the chuck member and a forming tool carried thereby and mounted thereon in a manner to permit radial movements of the forming tool with respect to the tube, reducing means in train with the tube rotating means for imparting longitudinal movements to the carriage relatively to the tube at such rate of advance as to bring each portion of the rotating tube repeatedly into contact with the forming tool while the tube is progressing through the region of deformation, automatic means for variably regulating the radial position of the tool with respect to the tube to impart variable reductions in the diameter of the tube, and a tube supporting member closely engaging the tube at a point adjacent to the forming tool and forwardly thereof and movable longitudinally with the forming tool and adapted in conjunction with the tool to maintain a constantly evolving shoulder in the tube between the supporting member and the tool.

16. In a tube forming machine of the class described, the combination of a chuck member adapted to engage the end of a tube, means for imparting rotation to said chuck member for rotating the tube, a carriage adjacent to the chuck member and a forming tool carried thereby and mounted thereon in a manner to permit radial movements of the forming tool with respect to the tube, reducing means in train with the tube rotating means for imparting longitudinal movements to the carriage relatively to the tube at such rate of advance as to bring each portion of the rotating tube repeatedly into contact with the forming tool while the tube is progressing through the region of deformation, a fixedly positioned longitudinally elongated template having an upturned edge adapted to impart variable radial movements to the tool to cause corresponding variable reductions in the diameter of the tube, and a tube supporting member closely engaging the tube at a point adjacent to the forming tool and forwardly thereof and movable longitudinally with the forming tool and adapted in conjunction with the tool to maintain a constantly evolving shoulder in the tube between the supporting member and the tool.

17. In a tube forming machine of the class described, the combination of a chuck member adapted to engage a tube, means for imparting rotation to said chuck member and the tube engaged thereby, a carriage laterally adjacent to the tube and reduction means in train with the tube rotating means for imparting relative longitudinal movement between the carriage and the tube at such reduced rate of advance as to bring each portion of the rotating tube into contact with the forming tool while the tube is progressing through the region of deformation, a forming tool mounted upon the carriage and guided for radial movement with respect to the axis of the tube, a member closely engaging the undeformed portion of the tube at a point adjacent to the forming tool and forwardly thereof and movable with the forming tool relatively longitudinally of the tube and adapted in conjunction with the tool to maintain a constantly evolving shoulder in the tube between the supporting members and the tool, and a longitudinally elongated template relatively fixedly mounted with respect to the carriage and the forming tool and the aforesaid tube engaging member associated therewith and having a configured edge adapted to impart variable radial movements of the tool to cause corresponding variable reductions in the diameter of the tube when the forming tool and the tube are moved longitudinally relatively to one another.

CLARENCE L. DEWEY.
SYDNEY L. DEWEY.